US012651694B2

(12) United States Patent
Goto et al.

(10) Patent No.: US 12,651,694 B2
(45) Date of Patent: Jun. 9, 2026

(54) VOICE COIL AND METHOD FOR PRODUCING VOICE COIL

(71) Applicant: GOTO DENSHI CO., LTD., Sagae (JP)

(72) Inventors: Yoshihide Goto, Sagae (JP); Taiki Goto, Sagae (JP)

(73) Assignee: GOTO DENSHI CO., LTD., Sagae (JP)

( * ) Notice: Subject to any disclaimer, the term of this patent is extended or adjusted under 35 U.S.C. 154(b) by 0 days.

(21) Appl. No.: 18/827,517

(22) Filed: Sep. 6, 2024

(65) Prior Publication Data

US 2025/0285801 A1 Sep. 11, 2025

(30) Foreign Application Priority Data

Mar. 6, 2024 (JP) .................................. 2024-33604

(51) Int. Cl.

| | |
|---|---|
| ***H04R 25/00*** | (2006.01) |
| ***H01F 27/29*** | (2006.01) |
| ***H01F 27/32*** | (2006.01) |
| ***H01F 41/04*** | (2006.01) |
| ***H04R 9/04*** | (2006.01) |
| ***H04R 31/00*** | (2006.01) |

(52) U.S. Cl.
CPC ........... *H01F 27/29* (2013.01); *H01F 27/325* (2013.01); *H01F 41/04* (2013.01); *H04R 9/04* (2013.01); *H04R 31/00* (2013.01)

(58) Field of Classification Search
CPC ................................. H04R 9/04; H04R 31/00
USPC ........................................ 381/410, 407, 406
See application file for complete search history.

(56) References Cited

U.S. PATENT DOCUMENTS

| | | | | |
|---|---|---|---|---|
| 4,088,847 A * | 5/1978 | Yukimoto | H04R 9/046 381/409 |
| 2005/0152572 A1* | 7/2005 | Suzuki | H04R 9/046 381/406 |

FOREIGN PATENT DOCUMENTS

| | | | |
|---|---|---|---|
| CA | 460775 | A | 11/1949 |
| EP | 0610769 | A2 | 8/1994 |
| JP | S49-13019 | B1 | 1/1970 |
| JP | H04-183099 | A | 6/1992 |
| JP | 2001-359191 | A | 12/2001 |
| JP | 2003-284188 | A | 10/2003 |
| JP | 2004-312222 | A | 11/2004 |

OTHER PUBLICATIONS

Japan Patent Office, Decision to Grant issued Jun. 6, 2024 in Japanese Patent Application No. 2024-33604 filed Mar. 6, 2024 (with English translation), 15 pages.

(Continued)

*Primary Examiner* — Phylesha Dabney
(74) *Attorney, Agent, or Firm* — MASUVALLEY & PARTNERS; Peter Martinez

(57) ABSTRACT

Two ends 5A, 5B of an electric wire 4 forming a coil 2 are made non-insulated by removing films. These two ends 5A, 5B are bent along surfaces of respective corresponding conductive foils 3A, 3B including the electric wire 4 following thereto in wounded states. Under such bent states, two ends 5A, 5B are compacted within the corresponding conductive foils 3A, 3B and are connected and fixed to the conductive foils 3A, 3B by solder welding and the like.

4 Claims, 2 Drawing Sheets

(56) References Cited

OTHER PUBLICATIONS

European Patent Office, Extended European Search Report dated Feb. 25, 2025 in European Patent Application No. 24201180.7, 10 pages.

* cited by examiner

*Fig. 1*
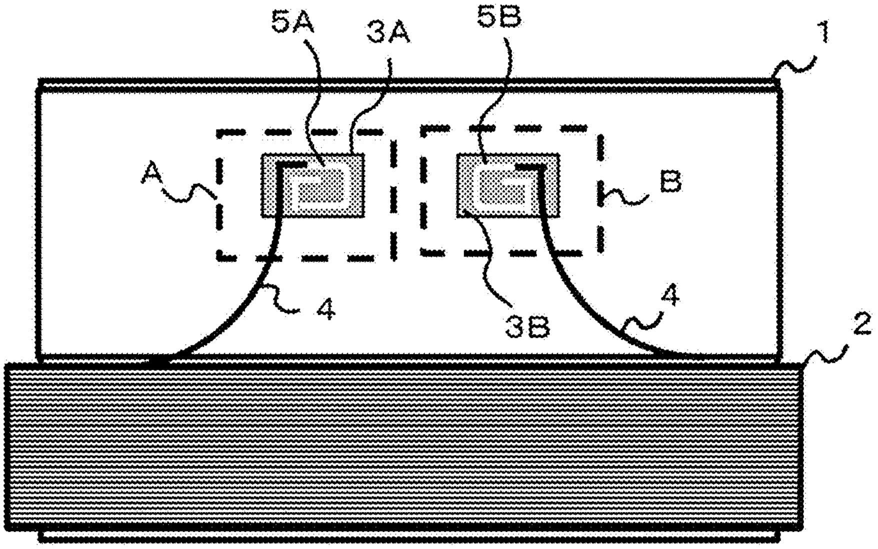
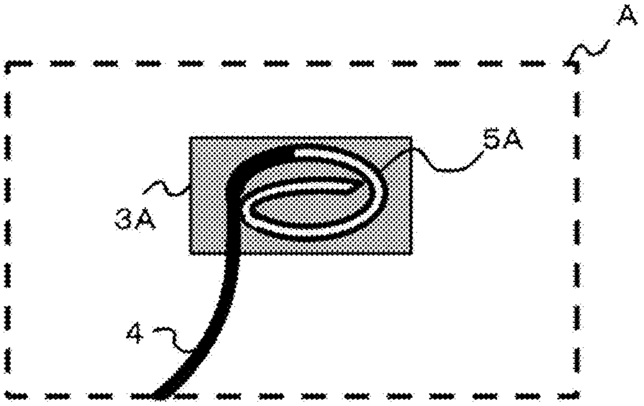
*Fig. 2A*
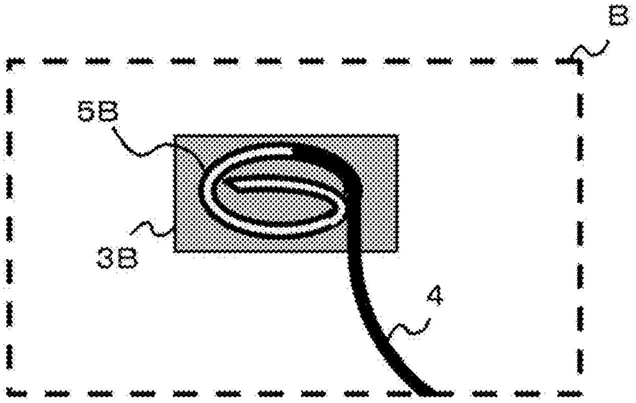
*Fig. 2B*

VOICE COIL AND METHOD FOR PRODUCING VOICE COIL

RELATED APPLICATIONS

This application claims priority under 35 U.S.C. § 119 to Japanese patent application No. 2024-33604 filed Mar. 6, 2024, which is hereby incorporated herein by reference in its entirety.

TECHNICAL FIELD

The present invention relates to a voice coil and a method for producing the voice coil.

BACKGROUND ART

A speaker unit usually uses a voice coil as a generation source of sounds. This voice coil has a structure in which an insulated electric wire is wound as a coil around a core material called as a coil bobbin and non-insulated ends of the coil (electric wire) is electrically connected to lead wires, for example, tinsel wires. The ends and the lead wires are usually connected electrically connected by attaching conductive foils such as copper foils and the like to the coil bobbin and by welding with solder (HANDA) and the like on the conductive foils (for example, refer to Patent Literature 1).

PRIOR ART LITERATURE

Patent Literature

Patent Literature 1 JP2003-284188

SUMMARY OF INVENTION

Problem to be Solved by Invention

Usually, non-insulation of the electric wire is performed by removing films for insulating the electric wire. Positions where the films are removed are easy to rust, and the like. The occurrence of the rust makes a lifetime of the voice coil shorter. Therefore, conventionally the films have been removed precisely so as not to expose the positions where the films have been removed. However, for removing the films precisely, a prolonged time is required. Thus, the time for producing the voice coil (tact time) becomes longer, thereby producing costs become expensive. From these reasons, it is also thought to be important to maintain qualities, to suppress the issues that shorten the lifetime of the voice coil and to further reduce the production costs thereof.

An object of the present invention aims to provide a technology that maintains qualities of the voice coil and to further reduce the production costs thereof.

Means for Solving Problem

A voice coil of one embodiment of the present disclosure comprises a coil bobbin; a coil wound to the coil bobbin; two conductive foils attached to the coil bobbin and each electrically connected to one of two ends of the coil; and two fixed connection parts for electrically connecting and fixing each of the two ends to the conductive foils in a state wound along surfaces of corresponding conductive foils.

A method for producing a voice coil of the present disclosure comprises providing a state in which each of non-insulated two ends of a coil wound to a coil bobbin is wound along surfaces of a corresponding conductive foils attached to the coil bobbin; and electrically connecting and fixing each of the two ends in the wound state to the corresponding conductive foils.

Advantageous Effect

The present invention can maintain qualities of a voice coil and can further suppress production costs thereof.

BRIEF DESCRIPTION OF DRAWINGS

FIG. 1 is a drawing for describing state examples under production of a voice coil of present invention.

FIGS. 2A and 2B are enlarged views of examples showing an A position and a B position shown in FIG. 1.

DETAILED DESCRIPTION

Figure 3A:
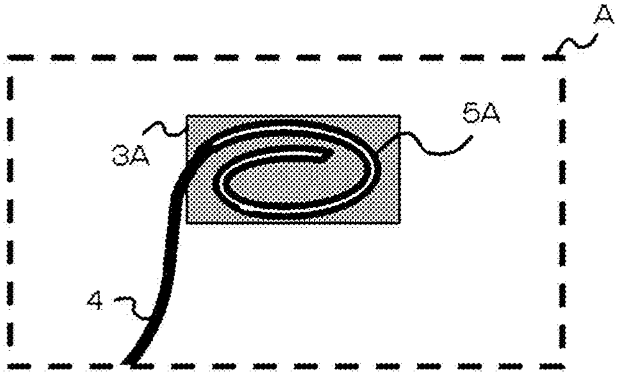
FIGS. 3A and 3B are enlarged views of other examples showing an A position and a B position shown in FIG. 1.

Hereafter, embodiments for practicing the present invention will be described with reference to drawings. It should be noted that embodiments described hereafter are mere examples including variations and a scope of the present invention should not be limited thereto. The scope of the present invention also includes various variations.

FIG. 1 is a drawing describing state examples under production of the voice coil of the embodiments of the present invention. As a front view which is exemplary illustrated in FIG. 1, this voice coil has a structure with winding a coil 2 at lower side of a coil bobbin 1 having, for example, a hollow cylindrical shape. Above the coil bobbin 1 than the coil 2, two conductive foils 3A, 3B are attached to the coil bobbin 1.

The coil 2 is one that formed by winding the electric wire 4 insulated with, for example, a film. Both ends 5A, 5B of the electric wire 4 forming the coil 2 (two ends) are non-insulated portions where the films are removed and are made to be non-insulated for attaining electrical connection with the conductive foils 3A, 3B. Further, there is not particular limitations for any kinds of the electric wire 4 and the electric conductive foils 3A, 3B. With respect to the electric wire 4, for example, an enamel-copper cladded aluminum wire (CCAW) and the like may be adopted. With respect to the coil bobbin 1, materials and shapes are not limited particularly.

FIGS. 2A and 2B are enlarged views showing examples of the A part and the B part depicted in FIG. 1. FIG. 2A shows an example of the enlarged views of the A part and FIG. 2A shows an example of the enlarged views of the B part, respectively. As shown in FIG. 2A, the end 5A corresponding to the conductive foil 3A is formed to a state wound along a surface of the conductive foil 3A and more particularly wound as a spiral shape. Because the end 5A is wound as such state, a length of the end 5A, which is the length for removing the film, has a high margin, and thus an allowable range becomes wider. By heightening the margin thereof, the allowable ranges of the positions where the film should be removed within the electrical wire 4 become wider such that the precision required therefor becomes lower.

Thereby, a method may be adopted such as, for example, shifting the position where the film should be removed further to the direction to the coil while further lengthening the length that the film is to be removed. Even when such method is adopted, as shown in FIG. 2A, without exposing the end 5A from the conductive foil 3A, it becomes easy to compact all of the end 5A within the range of the conductive foil 3A. Therefore, a worker can perform adequately processings for removal of the film on the electric wire 4 more easily and more securely. Deficiencies such as the exposure of the end 5A from the electric conductive foil 3A and the like can be avoided more securely and more easily. Thus, the cases that extra processings for re-working of the film removal and the like occur will be securely avoided.

These are similar to the B part. Thus, the production of voice coils that are predicted to become shorter lifetimes than those predicted at a designing stage will be avoided or will be further reduced. Since the adequate removal of the films at both end portions of the electric wire 4 can be done easier and more securely, a tact time will be shortened. Thus, it becomes realized that qualities of the voice coil are maintained while reducing the production costs.

Figure 3B:
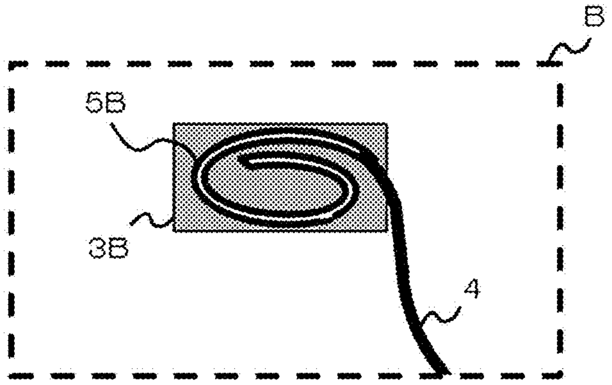

FIGS. 3A and 3B are enlarged views of other examples of the A part and B part shown in FIG. 1. FIG. 3A shows an example of the enlarged views of the A part and FIG. 3B shows an example of the enlarged views of the B part, respectively.

The examples shown in FIG. 3 are the cases that the position where the film is removed is shifted to a far side, that is, to the coil 2 side to which the electric wire 4 is wound and the length of the film removal is made longer too. As shown in FIG. 3A and FIG. 3B, even though the positions for removing the film and the lengths for removing the film are different, respectively, the ends 5A, 5B and the electric wire portions following thereto can be compacted within the ranges of the conductive foils 3A, 3B. From these viewpoints, the configuration that the ends 5A and 5B are formed to be bent is effective regarding the reduction of the required precision.

Figure 4:
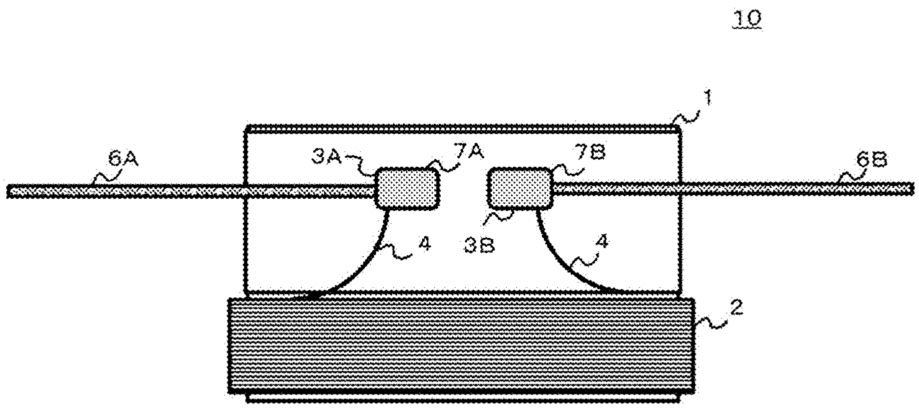
FIG. 4 is a drawing describing an example of a voice coil of an embodiment of the present invention.

FIG. 4 is a drawing describing an example of the voice coil of an embodiment of the present invention. A front view of FIG. 4 that illustrates an example is the case that a lead line 6A is electrically connected to the end 5A on the conductive foil 3A and a lead line 6B is electrically connected to the end 5B on the conductive foil 3B, respectively and those are fixed to the conductive foils 3A, 3B. Thereby, the solders 7A, 7B, which are fixed connection parts, are present on the conductive foils 3A and 3B respectively.

The ends 5A, 5B are, as shown in FIGS. 2A, 2B or FIGS. 3A, 3B, in the states that are bent like a wounded manner, and the whole thereof are covered by the solders 7A, 7B. The reason for forming the above configuration is to prevent the exposed metal portions of copper and aluminum of the ends 5A, 5B from rust or corrosion, and the like. Because the ends 5A, 5B bent like a wounded manner are electrically connected to the lead lines 6A, 6B by the solders 7A, 7B, the conductive foils 3A, 3B may be adopted from conventional ones. Thereby, an appearance of the voice coil 10 also can be made to be the same with conventional one or can be made similar one. The solders 7A, 7B correspond together to the fixed connection parts of the present embodiment.

In the case that the exposed portions of the ends 5A, 5B are covered by the solders 7A, 7B, the solders 7A, 7B cover the portions where the films of the electric wire 4 are not removed. In the case that the electric wire 4 is one that is coated by an insulator material, there may be adverse effects on an adhering force due to melting of the insulator material coated thereon. From the above reason and especially in the case that such electric wire 4 is adopted, as shown in FIGS. 2A, 2B and FIGS. 3A, 3B, it is preferred that each of ends 5A, 5B is wound at least one round so as to attain the electrical connection more securely.

Now, according to the present embodiment, although the solder welding is used as the electric connections between the ends 5A, 5B, the conductive foils 3A, 3B, and further the lead lines (for example, tinsel lines) 6A, 6B, the electric connection may be realized by the method different from the solder welding. Furthermore, although the electric connections between the ends 5A, 5B and the lead lines 6A, 6B are realized directly or through the solders 7A, 7B, the electric connection may be realized through the conductive foils 3A, 3B. That is, the ends 5A, 5B and the lead lines 6A, 6B may be connected electrically at the different positions on the conductive foils 3A, 3B.

With respect to the production method for producing the voice coil 10, process sequences or steps may not be limited particularly, and various variations may be possible. For example, the conductive foils 3A, 3B may be placed to the decided locations, after preparing each of the ends 5A, 5B and then determining the locations for placing depending on the positions of each of the ends 5A, 5B or the lengths thereof.

DESCRIPTION OF SIGNS

1 coil bobbin, 2 coil, 3A 3B conductive foils, 4 electric wire 5A, 5B ends, 6A, 6B lead lines, 7A, 7B solders (HANDA), 10 voice coil

The invention claimed is:

1. A voice coil comprising:

a coil bobbin;

a coil comprising a body and two end portions;

two conductive foils; and two fixed connection parts as solders;

wherein the body of the coil is insulated as the body is covered with a film and the two end portions of the coil are non-insulated as the film is removed therein, and the body of the coil is further wound around the coil bobbin;

wherein the two conductive foils are attached to the coil bobbin and each electrically connected to one of the two end portions of the coil such that the end portions are positioned in a state wound along surfaces of the corresponding conductive foils; and wherein the two fixed connection parts electrically connect and fix each of the two end portions of the coil to the conductive foils such that the two fixed connection parts completely cover the two non-insulated end portions of the coil from an exposure to corrosion.

2. The voice coil of claim 1, wherein each of the two ends is fixed by the two fixed connection parts in a state wound at least one round along surfaces of the corresponding conductive foils.

3. The voice coil of claim 1, wherein each of the two fixed connection parts fixes one of the two ends and a portion of the electric wire continuing to the one end.

4. A method for producing a voice coil comprising:

providing a coil and a coil bobbin wherein the coil is insulated with a film;

making two ends of the coil non-insulated by removing a portion of the film;

winding an insulated portion of the coil around the coil bobbin;

attaching the two non-insulated ends of the coil to two conductive foils positioned on the coil bobbin in a state in which each of the non-insulated two ends of the coil is wound along surfaces of the corresponding conductive foils; and electrically connecting and fixing each of the two non-insulated ends of the coil in the wound state to the corresponding conductive foils with two fixed connection parts such that the two fixed connection parts completely cover the two non-insulated ends of the coil from an exposure to corrosion.

* * * * *